Oct. 13, 1936.                D. E. SHARP                2,057,395

REFLECTOR

Filed Aug. 1, 1935

INVENTOR
Donald E. Sharp
by Parker, Grechnow & Harmer
ATTORNEYS

Patented Oct. 13, 1936

2,057,395

UNITED STATES PATENT OFFICE 2,057,395

REFLECTOR

Donald E. Sharp, Hamburg, N. Y., assignor to Bailey & Sharp Co. Inc., Hamburg, N. Y.

Application August 1, 1935, Serial No. 34,232

16 Claims. (Cl. 88—78)

This invention relates to optical devices, and particularly to reflecting buttons or units which may be employed in automobile tail light lenses, or in signs, danger signals, and various advertising devices.

Reflecting units or buttons used in the past have depended upon a symmetrical distribution of the incident light beam, by which a ray of light entering the device became refracted or reflected back in a line substantially parallel to its line of incidence. In order to achieve wide angularity of operation with the lens and button type of reflecting units, it has been the custom heretofore to make the external or incident surface spherically convex. Thus a sign composed of a multiplicity of such buttons shows externally at its front surface a series of convex glass surfaces or protuberances, often hemispherical and extending out in front of the surfaces of the sign as much as a half inch to an inch, depending upon the radius of curvature for such convex surfaces.

An object of this invention is to provide an improved reflecting unit or button, with which the convex front or incident surface is eliminated, which is more compact than previous units and buttons, which projects to a lesser degree from the face of a sign formed with such buttons, and which lends itself more readily to utilization in signs or signals.

Another object of the invention is to provide an improved and simple reflecting unit or optical device, with which some of the incident light will be returned in generally the same direction whether incident on the reflecting device or button in a direction parallel to the axis of the unit or button, or at an appreciable acute angle thereto, which may be manufactured satisfactorily by molding operations, and which will be relatively simple, effective and inexpensive.

Another object of the invention is to provide an improved reflecting lens of the type used in automobile tail lights, and which may be illuminated adequately either by transmitted light or by reflected light.

Various other objects and advantages will be apparent from the following description of several embodiments of the invention, and the novel features will be particularly pointed out hereinafter in connection with the appended claims.

Figure 1:
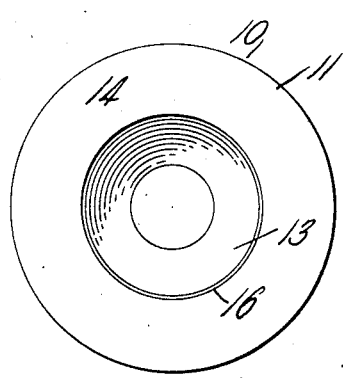
Fig. 1 is a front or face elevation of a reflecting unit constructed in accordance with this invention.
Figure 2:
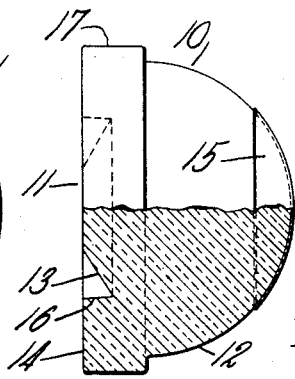
Fig. 2 is a side elevation, partly in section, of the same.
Figure 3:
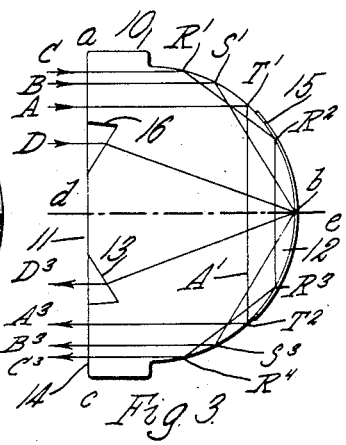
Fig. 3 is a cross sectional diagram of the same illustrating the optical principle of operation of such a unit.

Referring particularly to Figs. 1 to 3, the improved button or unit 10 is fo..med of any suitable transparent material, such as of glass or of synthetic resins and has an approximately or generally flat, front face 11 and an arcuate, convex rear face 12. This rear or convex face 12 is preferably a surface of revolution formed by a curved line rotating about an axis of revolution with which it intersects. The curve which represents the generating line may be of any desired type, among which may be mentioned a section of a circle, a parabola, a hyperbola, and an ellipse. For example, the generating line is illustrated as a section of a circle, so that a section of a spherical surface is generated when the curve $a, b, c$ (Fig. 3) is rotated about the axis of revolution $d$—$b$—$e$.

The front face 11 is provided with an annular or ring-like, prismatic face or surface 13 which is concentric about the axis of revolution $d$—$e$. The outer circumference of this surface 13 is spaced well in a radial direction from the outer periphery of the button, so as to leave a relatively large annular flat zone or space 14 on the front face of the button adjacent the periphery thereof. The portion or zone of the front face 11 which is enclosed by the inner circumference of the ring-like surface 13, is preferably approximately flat or normal to the axis of revolution.

Suitable light reflecting means 15 is disposed adjacent to and facing the central zone of the convex rear face of the unit or button, and in Figs. 1 to 3 this reflecting means 15 may be a mirror coating or silvered surface applied to the convex face or it may be a metallic shell with a polished concave surface, such as a chromium or aluminum reflector fitting the convex face. The reflecting means is preferably actually in contact with such convex face and should cover the central zone of the convex face and may advantageously extend toward the periphery of the button at least until its periphery is approximately aligned with the outer periphery of the prism face 13. As a matter of convenience, the reflecting means may be and preferably is extended entirely to the periphery of the button or convex face, but in such a case the outer marginal portion apparently does not function as a reflector to any great extent. When the reflecting means is a mirror or silvered coating, it is more easily applied over the entire convex face than merely to a central zone thereof.

The optical function of a button, such as shown in Figs. 1 and 2, in reflecting light back in the same general direction, insofar as it is understood, is illustrated in Fig. 3 diagrammatically. Assume that a beam of light is incident upon the unit in a substantially perpendicular relation to the front face of the unit. In this beam, certain of the rays take paths which will be described hereinbelow, and other rays near them will take paths about or substantially the same, but which deviate slightly therefrom, depending upon their distance from the specified rays. Referring particularly to Fig. 3 the ray A strikes the flat, annular, peripheral zone 14 of the front face 11 in a direction substantially normal thereto. Since the ray A is travelling in a direction parallel to the axis $d$—$e$ of the unit, it continues through the button body without material deviation until it strikes the rear convex face at the point $T^1$. The angle of incidence of this ray on the convex rear surface is greater than the critical angle of reflection, and hence this ray is internally reflected and takes the direction $A^1$.

No reflecting surface is necessary for ray A in order to cause this internal reflection, but the presence of such a mirrored or reflecting surface does not prevent the internal reflection of the ray from taking place in the manner described. This reflected ray $A^1$ again engages the convex rear face at the point $T^2$, and suffers another internal reflection in the same manner, but by which the ray is turned outwardly and travels in a direction parallel to its original path, yet in the opposite direction. It passes through the flat surface 14 without material deviation and emerges as the ray $A^3$. A ray of light striking such as $A^3$ but travelling in the opposite direction would undergo similar internal reflections and would emerge along the path of the ray A but in the opposite direction.

If another ray of light B travelling in the same direction as the ray A, but at a point nearer the periphery of the button, strikes the flat peripheral zone 14 of the front face 11, it undergoes similar internal reflections but instead of only two reflections, three reflections will take place, one at $S^1$, one at $b$ and one at $S^3$. These reflections also depend upon the critical angle and are independent also of the presence or absence of a metallic reflector 15. The emerging ray from the incident ray B is designated $B^3$. If another ray C strikes the same zone 14 of the front face but still nearer the periphery of the button than the rays A and B, it undergoes reflections similar to those of the rays A and B, except that in this instance it undergoes four internal reflections at $R^1$, $R^2$, $R^3$, and $R^4$, the ray emerging as $C^3$.

Let it now be assumed that one of the rays, such as a ray D, strikes the prism face 13. This ray D being parallel to the rays A, B, and C, strikes the prism face 13 at an acute angle thereto, because the prism face 13 itself is angularly disposed toward the axis of the unit. Inasmuch as ray D engages the surface 13 at an acute angle thereto, it is refracted upon entering the button, toward the axis through an angle which depends upon the index of refraction of the glass or other transparent material of which the unit is composed. The path of this ray D within the button body, instead of being parallel to the axis $d$—$e$, is now directed toward the axis. The angularity of the prism surface 13 is preferably so designed or selected that a mean or average ray, such as the ray D, will strike the rear convex surface at a point where the surface is pierced by the axis $d$—$e$.

Inasmuch as the central zone of the convex face of the button is abutted by a reflecting mirror or other means 15, the ray D which strikes the convex rear face at the point $b$ will be reflected toward the portion of the prism surface 13 at the opposite side of the axis of the button. Since the angle of incidence is equal to the angle of reflection, the ray D, in its reflection from the rear convex face, leaves the axis $d$—$e$ at the same angle at which it arrived. Consequently this ray D again strikes the prism surface 13 at such an angle that upon refraction, at this surface, of this emerging ray, the latter will travel substantially parallel to the original ray D except, of course, that it is travelling in the opposite direction. The emerging ray, which is the reflected ray D, is designated $D^3$.

The light rays striking the central zone of the flat front face of the button, such as in the central zone encircled by the prism surface 13, will pass directly to the back of the button and there be reflected, by the mirror or other reflecting means 15, back in the opposite direction at nearly the same angle, because the central zone of the mirror 15 is nearly normal to the axis and to the rays striking the central portion of the button, and hence will be reflected backwardly in nearly a parallel relation to the incident rays. From this description it will be observed that a major portion of the light rays striking the approximately flat front face of this improved button, and travelling in a direction approximately parallel to the axis of the button, will be reflected back in paths approximately parallel to the incident rays, but the central rays striking the front face of the button in a central zone thereof may be spread slightly in leaving the button.

Light rays striking the buttons from a position directly in front thereof, will be reflected backwardly towards the source and the buttons will be visible by reflected light from a position at or closely adjacent a line from the source of light to said buttons. If the light rays striking the front face of the button should, however, strike the front face at an angle to the axis of the button some of these incident rays will still be reflected backwardly in paths approximately parallel to the incident rays, but in such a case there will possibly be some spread of the reflected rays, which is desirable, although there may be some loss of efficiency in the reflection.

In the form of the invention shown in Figs. 1 to 3, the prism surface or ring 13 is provided as one wall of a groove or depression in the front face of the button or unit, the other wall 16 of the annular groove or depression being outwardly divergent, or slightly frusto-conical with the larger base outermost, in order to provide sufficient taper to facilitate the removal of the molding die from the groove when the prism face is molded. In order to facilitate the mounting of the button in a frame or upon a support, the unit or button is preferably provided at its peripheral edge with a flange or shoulder 17.

Figure 4:
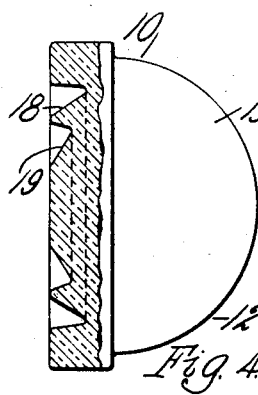
Fig. 4 is a side elevation, partly in section, of another embodiment of the invention.

In Fig. 4 a button or unit similar to that shown in Figs. 1 to 3 is illustrated, except that in place of the single prism ring or face 13 of Figs. 1 to 3, I have substituted two prism rings or faces 18 and 19 which together have approximately the same overall width as the single ring or face 13 of Figs. 1 and 2, but which have different angles of inclination to the axis of the button or unit, so that more of the rays striking the prism rings or faces will be reflected backwardly in a direction parallel to the incident rays. The prism ring 18 being furthest from the axis of the button will have the smallest inclination to the axis, and the ring 19 being nearer the center of the button will make a greater angle to the axis of the button. The angles that the prism rings 18 and 19 make with respect to the axis of the button are such that the medium or average rays striking the same will be all refracted to meet approximately at that point of the rear convex face where the latter is intersected by the axis of the button. The optical operation of such a button is otherwise similar in all respects to that described in connection with Fig. 2 and need not therefore be repeated.

Figure 5:
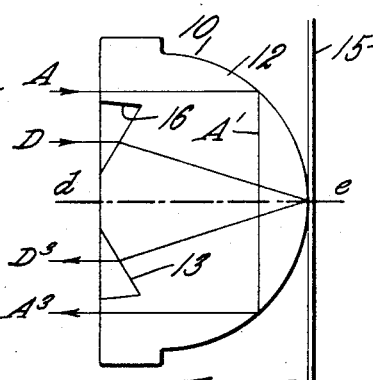
Fig. 5 is a cross sectional diagram illustrating a modification of the unit and the optical action of this modification on incident light rays.

In Fig. 5 the embodiment of the invention there illustrated is similar to that shown in Figs. 1 to 3 except that the reflecting means or mirror 15 of Figs. 1 to 3 does not fit the curvature of the convex rear face of the button and is replaced by a flat mirror plate 15A which is approximately tangent to the convex face of the button where the axis of the button intersects the convex face. A flat mirror, plate 15A is simple and less expensive to manufacture than the concave or arcuate form shown in Fig. 3, but it is less efficient in its operation. With such a straight or plain mirror 15A there will possibly be more spreading of the reflected rays than with the concave form shown in Fig. 3.

Figure 6:
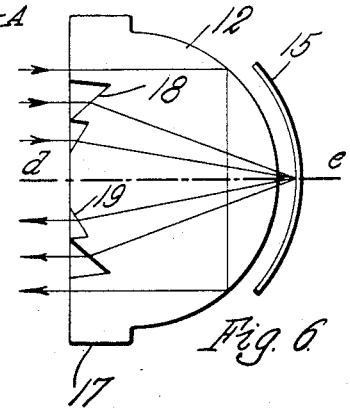
Fig. 6 is a somewhat similar diagram of another modification of the invention.

In Fig. 6 still another embodiment of the invention is illustrated diagrammatically, in which the reflector 15 is concave as in Fig. 3, but is spaced slightly from the convex rear face by air or other transparent medium, and the prism face or ring 13 of Fig. 3 is replaced by a plurality of smaller prism rings or faces 18 and 19 as in Fig. 4. The average rays striking the prism rings 18 and 19 instead of being refracted to a common point on the convex rear face as in Fig. 3 will be refracted approximately to a common point on the reflector 15 where the latter is pierced by the axis d—e of the unit. The optical action of this unit is similar to that of the other units described, except that because of the air gap or other medium between the reflector 15 and the rear face of the unit, some refraction of the rays may occur as they pass through the air gap or other medium in leaving and entering the rear face of the button. This refraction may result in some spreading of the reflected rays, and there will probably be some loss of efficiency in the reflection.

Figure 7:
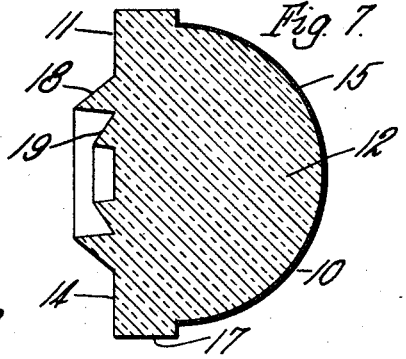
Fig. 7 is a cross section of a unit and illustrating still another modification of the invention.

In Fig. 7 still another embodiment of the invention is illustrated in which the reflector 15 extends entirely to the flange 17 at the periphery of the button, and the prism rings 18 and 19, instead of being formed by grooves in the flat front face of the button or unit as in Figs. 1 to 6, are formed as projecting ring-like prisms, but the optical action of the rings 18 and 19 is the same as in Figs. 1 to 6.

It will be understood that the diagrams of the Figs. 3, 5, and 6 in effect, represent cross-sections of the buttons, but are shown diagrammatically instead of in section, in order not to obscure the paths of travel of the rays of light.

Figure 8:
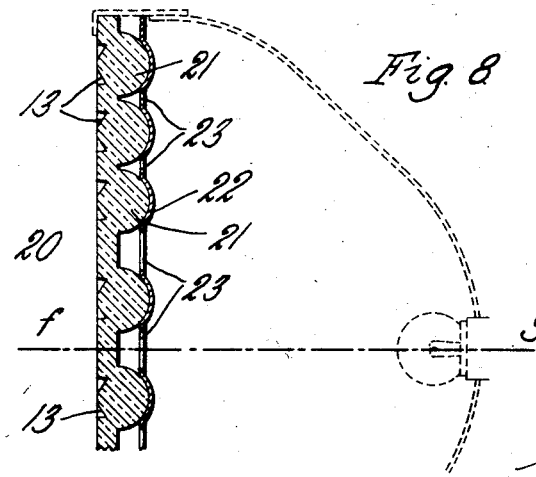
Fig. 8 is a sectional elevation of part of a multiple unit reflector also constructed in accordance with this invention, and applicable for use as an automobile tail light lens.

In Fig. 8 still another embodiment of the invention is illustrated, this particular embodiment being one that is particularly adapted for use as an automobile tail light lens, and also to illustrate how the buttons may be cast or molded in clusters. In this form of the invention a block 20 of glass or other moldable transparent material, is provided on its front flat face with a plurality of prism rings 13 disposed at intervals across the face of the plate or block, and the rear face of the block or plate is provided with a plurality of convex protuberances 21, each of which is aligned with the axis of a prism ring 13 on the opposite face and forms with the forward face the equivalent of a unit or button. A common reflector plate 22 may be fitted partially or entirely over the rear faces of the convex protuberances 21, so as to reflect backwardly through the block, light rays passing through the block from the flat front face, and striking the convex rear faces of the convex protuberances. The plate 22 may, however, be replaced by silvering, or a reflective paint, applied directly to the convex protuberances.

When the block or cluster is intended for use as a tail light lens, the clusters may be arranged closer together around the periphery of the lens and spaced further apart in the central area of the lens, as shown in Fig. 8, the axis or center line of the cluster being shown by the line f—g in Fig. 8. The reflector plate 22 may have a plurality of apertures 23 in the spaces between the protuberances, and these apertures 23 will preferably be larger where the space between adjacent protuberances is greater. These apertures 23 pass transmitted light from a light source which may be disposed at the rear of a lens or cluster, yet a considerable amount of incident light striking the front face of the cluster or block will be backwardly reflected by the individual units or buttons of the cluster, as explained in connection with Figs. 1 to 7.

In determining the angle which the prism rings make to the axis of the button or unit, the angle will vary with changes in the character of the material of which the button or unit is made, because it varies with the refractive index of the material of the unit or button. The criterion or rule employed to determine the prism angle is that the average ray striking the prism surface in a direction parallel to the axis of the unit shall be refracted through such an angle that it will strike the rear convex surface of the unit approximately where that surface is pierced by the axis, or in the case where the reflecting means is spaced from the button, as shown in Fig. 6, the refracted rays must strike the reflecting surface approximately where that surface is pierced by the axis. The angle of refraction depends upon the angle of the prism and upon the refractive index of the material employed, in accordance with the familiar optical law, namely that $$N \sin R = \sin I$$

where I is the angle of incidence and R is the angle of refraction.

Inasmuch as the optical performance of the various units or buttons has been explained in connection with various figures, a summarized statement of such performance would appear to be unnecessary to an understanding of the invention, and has therefore been omitted in the interest of brevity.

It will be understood that various changes in the details of construction, and of the materials employed, which have been herein described and illustrated in order to explain the nature of the invention by means of specific examples, may be made by those skilled in the art within the principle and scope of the invention, as expressed in the appended claims.

I claim as my invention:

1. A reflecting unit comprising a body of transparent material having as one face thereof an approximately hemispherical surface of revolution in which the generating line is a curve and cuts the axis of rotation, and having as its opposite face relatively flat and prismatic zones concentric to said axis, and light reflecting means adjacent and facing said surface of revolution, said flat zone being generally normal to said axis and encircling said prismatic zone, and disposed to transmit those incident light rays that are approximately parallel to said axis and are in the annular band which will strike the marginal zone of said surface of revolution at angles greater than the critical angle, and be internally reflected back generally in the direction of their source by the surface of revolution, said prismatic zone making an angle to said axis such that it will transmit those incident light rays that are generally parallel to said axis and outside of said band, and refract them to said light reflecting means at such an angle thereto as to cause those rays when reflected to return generally in the direction of said source.

2. A reflecting unit comprising a body of transparent material having as one face thereof a convex surface of revolution in which the generating line is a curve and cuts the axis of rotation, a light reflector along and facing the central zone of said surface, the opposite face of said body having an approximately flat zone disposed approximately normal to the axis of rotation, and also having a zone inclined to and concentric with said axis of rotation at an angle such that light rays parallel to said axis and incident on the inclined zone will be refracted to said surface of revolution approximately at said axis.

3. An optical unit comprising a glass body with a convex rear surface and an approximately flat front surface, said front surface having thereon an annular prismatic ring zone concentric with the axis of said rear surface and so inclined to said axis that rays of light parallel to said axis and striking the middle of the ring zone will be refracted toward and will meet said axis approximately at the intersection of said axis with the rear surface.

4. An optical unit comprising a transparent body with a convex rear surface and an approximately flat front surface, said front surface having, in its central area, an annular surface zone which is inclined to the axis of the unit at such an angle that rays of light parallel to the axis of the unit and incident on said zone will be refracted toward and will meet the axis approximately at its intersection with the convex rear surface.

5. An optical unit comprising a transparent body with a convex rear surface and an approximately flat front surface, said front surface having, in its central area, an annular surface zone which is inclined to the axis of the unit at such an angle that rays of light parallel to the axis of the unit and incident on said zone will be refracted toward and will meet the axis approximately at its intersection with the convex rear surface, and light reflecting means approximately at the central zone of said rear surface.

6. An optical unit comprising a transparent body with a convex rear surface, the front face of said body being approximately flat and normal to the axis of said rear surface in a peripheral, annular, ring-like zone of substantial width, a light reflector disposed adjacent and facing said rear surface, crosswise of said axis, said zone extending toward said axis a distance such that rays of light entering said unit at said zone at its inner marginal edge will strike said rear surface with an angle of incidence greater than the critical angle of internal reflection, said front face also having, within said inner marginal edge, an annular frusto-conical surface zone whose axis approximately coincides with the axis of said rear surface, with said frusto-conical surface inclined to said axis at an angle such that light rays incident thereon from in front of the unit and parallel to said axis, will be refracted to said axis at approximately its intersection with said rear surface.

7. An optical unit comprising a transparent body with a convex rear surface, the front face of said body being approximately flat and normal to the axis of the unit in a peripheral, annular, ring-like zone of substantial width, said front face also having an annular prismatic surface concentric with said axis and within said peripheral zone, said prismatic surface being so inclined to said axis that light rays incident thereon from in front of the unit and approximately parallel to said axis will be refracted to a localized small zone approximately at said convex rear surface and light reflecting means approximately at said convex rear surface in the central zone thereof.

8. An optical unit comprising a transparent body with a convex rear surface, the front face of said body being approximately flat and normal to the axis of the unit in a ring-like peripheral zone of substantial width, and also having a plurality of annular prismatic surfaces encircled by said peripheral zone and concentric with one another and with said zone, the inclination of said prismatic surfaces being such that light rays parallel to the axis of the unit and striking said prismatic surfaces from in front of the unit, will be refracted toward said axis to meet said rear surface in a zone adjacent to said axis, and light reflecting means approximately at said convex rear surface in the central zone thereof for reflecting outwardly of the unit through the front face thereof, said refracted light rays.

9. A reflecting means, comprising a group of units moulded from a single body of transparent material, having on the front surface of each unit a prismatic annular ring surrounded by a relatively flat ring, said body having on its rear surface a series of convex protuberances one of which is axially aligned with each prismatic ring on the front surface and each of which is of greater diameter than the diameter of its aligned prismatic ring, said protuberances being spaced from one another by relatively flat areas, and a common reflecting metallic surface for all of said units, disposed adjacent to and facing said rear surface and approximately co-extensive therewith, said reflecting surface having light transmitting zones between said units in alignment with said spaced flat areas.

10. A reflecting means, comprising a group of units moulded from a single body of transparent material, having on the front surface of each unit, a prismatic ring surrounded by a relatively flat ring, said body having on its rear surface a series of convex protuberances, one of which is axially aligned with each prismatic ring on the front surface and of a diameter greater than that prismatic ring with which it is aligned, and a metallic reflecting element adjacent to and facing said rear surface and provided with a plurality of openings disposed between local central zones of said protuberances for passing light rays.

11. An optical reflecting unit comprising a body of transparent glass having a convex rear face representing a curved surface of revolution, the front face of the body having an annular, flat, ring-like zone concentric with but normal to the axis of revolution of said surface and extending toward said axis from its outer margin that is aligned approximately with the periphery of the convex face, said front face, within said ring-like zone, having a ring-like prism surface so inclined to said axis as to refract toward said axis, light rays incident on said prism surface in a direction parallel to said axis, and light reflecting means disposed approximately against and facing said convex rear face in the central zone thereof.

12. A light reflecting unit comprising a body of transparent material having as its rear face a surface of revolution in which the generating line is a conic curve that intersects the axis of revolution, and having on its opposite and front face a peripheral annular surface that is generally flat and concentric with said axis, said front face also having within the area bounded by said annular surface, an annular prismatic ring surface which is so inclined to said axis that light rays incident thereon from in front of the unit and generally parallel to said axis will be refracted to a common local zone of small area on said rear face, and reflecting means disposed adjacent and facing said rear face in the central zone thereof.

13. A light reflecting unit comprising a body of transparent material having as its rear face a surface of revolution in which the generating line is a conic curve that intersects the axis of revolution, and having on its opposite and front face a peripheral annular surface that is generally flat and concentric with said axis, said front face also having within the area bounded by said annular surface, an annular prismatic ring surface which is so inclined to and concentric with said axis that light rays incident thereon from in front of the unit and generally parallel to said axis will be refracted approximately to a common local zone on said rear face where said rear face is pierced by said axis, and reflecting means disposed adjacent and facing said rear face at, and coextensive with, said local zone.

14. A reflecting unit comprising a body of transparent material having as its rear face a convex surface of revolution in which the generating line is a conic curve and cuts the axis of rotation and having on its opposite and front face a generally flat marginal zone approximately normal to said axis and also having on said front face within the area bounded by said marginal zone a prismatic surface at such an inclination to said axis that light rays incident thereon from in front of the unit and travelling generally parallel to said axis before incidence on the unit will be refracted to said rear surface in a small central zone thereof.

15. A reflecting unit comprising a body of transparent material having as one face thereof a surface of revolution in which the generating line is a conic curve and cuts the axis of rotation, and having on its opposite face an annular prism surface disposed at such an angle to said axis that it refracts to said surface of revolution at approximately said axis thereof, light rays incident on said annular surface in a direction approximately parallel to the axis of rotation, and also on said opposite face a relatively flat zone that is approximately normal to said axis of revolution, of substantial width and encircling said prism surface, the center thickness of said unit being not less than the radius of curvature of said surface of revolution, and light reflecting means adjacent and facing said surface of revolution.

16. A reflecting signal comprising a plurality of reflecting units arranged side by side, each of which consists of a transparent body with a convex rear surface, and with an aligned front surface which is generally flat in its outer areas but which is also provided with a prismatic refracting ring in its central area, and a reflecting mirror adjacent to and facing each convex surface of a unit of said transparent body, said mirrors being joined to form a unitary mirror element, each of said rings being positioned at such an inclination to the axis of its unit, that light rays incident on said ring in a direction approximately parallel to said unit axis will be refracted to a local zone of small area on the convex rear surface of the same unit at approximately said mirror, said mirror element having light transmitting areas at points spaced from the central areas of said convex rear surfaces.

DONALD E. SHARP.